United States Patent [19]
Loo

[11] Patent Number: 4,685,077
[45] Date of Patent: Aug. 4, 1987

[54] DATA PROCESSING APPARATUS HAVING BINARY MULTIPLICATION CAPABILITY

[75] Inventor: Johnson Loo, Newcastle-under-Lyme, England

[73] Assignee: International Computers Limited, London, England

[21] Appl. No.: 692,348

[22] Filed: Jan. 17, 1985

[30] Foreign Application Priority Data

Jan. 24, 1984 [GB] United Kingdom ............... 8401808

[51] Int. Cl.[4] ............................................. G06F 7/52
[52] U.S. Cl. .................................................. 364/759
[58] Field of Search ................................. 364/759, 760

[56] References Cited

U.S. PATENT DOCUMENTS 3,761,699 9/1973 Sather .................................. 364/759
4,228,518 10/1980 Chamberlin ......................... 364/759
4,589,086 5/1986 Beifuss et al. ...................... 364/760

Primary Examiner—David H. Malzahn
Attorney, Agent, or Firm—Lee, Smith & Zickert

[57] ABSTRACT

There is described a data processing apparatus with a binary multiplication capability. The apparatus has an arithmetic and logic unit (ALU) and a operand register. The operand register is divided into two portions, the first of which can be shifted while the second is loaded in parallel. For multiplication, the first portion is used to hold a multiplier and to receive the least significant bits of the result, while the second portion receives the most significant bits of the result. The invention avoids the need for a separate shift register to hold the multiplier. The described apparatus also has a look-ahead facility, for selecting the next bit of the multiplier ahead of its requirement, so that it is immediately available when required.

6 Claims, 1 Drawing Figure

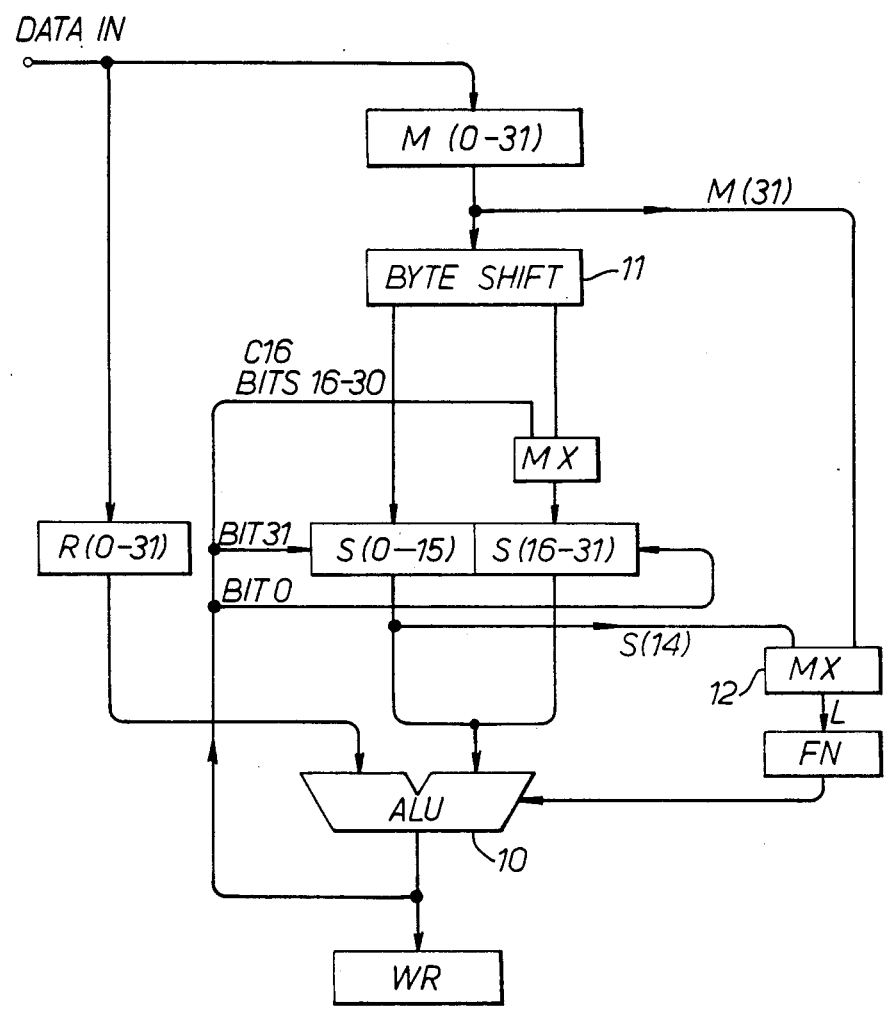

DATA PROCESSING APPARATUS HAVING BINARY MULTIPLICATION CAPABILITY

BACKGROUND TO THE INVENTION

This invention relates to binary multiplication. More specifically, the invention is concerned with data processing apparatus having a binary multiplication capability.

U.S. patent specification No. 4,228,518 describes a data processing apparatus having an arithmetic and logic unit (ALU) and an operand register (A) connected to one input of the ALU. The ALU is capable of performing various elementary operations such as addition or subtraction. Multiplication and division can also be performed, using a special shift register (M). For multiplication, one of the operands (the multiplier) is initially loaded into the M-register, and the A-register is set to zero. Each bit of the multiplier is then shifted out in turn, starting from the least significant bit. If the multiplier bit is 1, the other operand (the multiplicand) is added to the contents of A-register; otherwise, zero is added. In either case, the result of the addition is shifted one place to the right and then loaded back into the A-register, the least significant bit being inserted into the most significant end of the M-register. This is repeated until all the bits of the multiplier hve been used. At the end of the multiplication, the A-register holds the most significant bits of the product, and the M-register holds the least significant bits.

It can be seen that the arrangement described above the M-register represents an additional item of hardware which is provided specially for use in multiplication (and division).

The object of the present invention is to provide a means for performing multiplication without the need for an additional register.

SUMMARY OF THE INVENTION

According to the invention there is provided a data processing apparatus comprising an operand register and an arithmetic and logic unit (ALU) having a first input connected to the operand register and a second input for receiving a multiplicand during a multiplication operation, wherein the operand register comprises first and second portions, the first portion being operable as a shift register independently of the operation of the second portion and wherein the apparatus includes: an input path for loading a multiplier into the first portion at the start of a multiplication operation, a circuit for reading successive bits of the multiplier from the first portion while that portion is shifted to the right, and for controlling the ALU in accordance with the value of each such bit to produce a partial result equal to the sum of the two inputs of the ALU if the multiplier bit is 1, and otherwise equal to the first input, and a path for feeding the partial result back to the operand register allowing the least significant bit of the partial result to be inserted into the most significant bit position of the first portion and allowing the remaining bits of the partial result to be loaded in parallel into the second portion, simultaneously with the shifting of the first portion.

It can be seen that, in multiplication, the operand register serves a dual purpose: it stores the multiplier and also receives the output of the ALU. Hence, no additional register is required to hold the multiplier. Because the register is divided into two independently operable portions, the multiplier can still be shifted simultaneously with the loading of the ALU, and hence there is no loss of speed.

BRIEF DESCRIPTION OF THE DRAWING

One embodiment of the invention will now be described by way of example with reference to the accompanying drawing which is a logic diagram of a processing unit for a data processor, which is capable of performing various arithmetic and logical operations including multiplication.

DESCRIPTION OF AN EMBODIMENT OF THE INVENTION

Referring to the drawing, the processing unit comprises two registers R and M which hold respective 32-bit operands for processing. The contents of the R register are fed directly to one input of an arithmetic and logic unit (ALU)10. The contents of the M register are fed to a byte shift circuit 11 which is capable of shifting the operand right or left by a whole number of bytes (a byte being eight bits).

The output of the byte shift circuit 11 is fed to a shift register S. The S register is split into two 16-bit portions S(0-15) and S(16-31). Each portion is operable independently, either in a shift mode (to shift its contents to the right or left) or in a load mode, in which case it can be loaded in parallel from its data input. In particular, it is possible to operate the first portion S(0-15) in the shift mode while the second portion S(16-31) is being loaded in parallel. The contents of the S register are fed to the second input of the ALU 10.

The ALU 10 is a conventional unit, and is capable of performing various functions on the two inputs such as add, subtract, logical AND, and so on. It can also pass either of the inputs to the output without modification, effectively adding zero to the selected input.

The function performed by the ALU is controlled by a function code, held in a function register FN. This code is generally determined by the current machine instruction, in the conventional manner. However, in the case of a multiply instruction, the function code is determined by a control bit L, which represents the value of the next multiplier bit to be considered. The control bit L is selected by a multiplexer 12 either from the least significant bit M(31) of the M register or from bit S(14) of the S register. When L=1, the function code is set to specify addition of the inputs of the ALU, and when L=0, it specifies that the ALU should pass the second input (i.e. from the S register) without modification.

The output of the ALU 10 is fed to a write register WR, from which it can be written into a memory (not shown). Bits 16-30 of the ALU output, along with the carry-out signal C16 from stage 16 of the ALU, are also fed in parallel to the data input of S(16-31). These connections are displaced one bit to the right, so that bit 30 from the ALU is connected to bit position S(31) and so on, the carry-out C16 being connected to S(16).

The least significant bit of the ALU output (bit 31) is fed to the left-hand end of the S register, and can be shifted into S(0) when S(0-15) is shifted to the right. Similarly, the most significant bit of the ALU output (bit 0) is fed to the right-hand end of the S register and can be shifted into S(31) when S(16-31) is shifted left. These connections can be used in performing cyclic shifts on the contents of the S register. The connection for bit 31 is also used in multiplying, as will be described.

It can be seen that the processing unit can perform various operations. For example, it can add two 32-bit operands in registers R and S, placing the result in the write register WR. By operation of the byte shift circuit 11, one of the operands can be shifted by a whole number of bytes before it is placed in the S register. Also, by operation of both portions of the S register in the shift mode, that operand can be shifted one or more bit positions. These two different methods of shifting can be used together to produce rapid shifts of any length. For example, if it is desired to shift an operand by 17 bit positions, this can be achieved by shifting it by two bytes in the byte shift circuit 11, and then by one bit in the S register.

The processing unit is also capable of multiplying two 16-bit operands together to produce a 32-bit result as follows.

The multiplication operation starts with a decode phase, occupying one clock beat, in which the following actions are performed:

(1) The first operand (the multiplier) is gated into the M register. Since the multiplier is sixteen bits long, it occupies only the sixteen least significant bit positions M(16-31), the other bits being all zero.

(2) The multiplier is given a 16-bit shift to the left, by means of the byte shift circuit 11. This moves the multiplier into the most significant sixteen bit positions.

At the same time, bit M(31) is selected by the multiplexer 12 to provide control signal L.

(3) At the end of the decode beat, the second operand (the multiplicand) is gated into the R register, where it occupies bit positions R (16-31). At the same time, the shifted multiplier is gated into the S register, where it occupies bit positions S(0-15). Also, at the same time, the control signal L is used to set the function code in the FN register as described above.

It can be seen that the operation of the byte shift circuit is overlapped with the arrival of the second operand, and hence does not cause any extra delay.

The first portion S(0-15) is now put into the shift mode, the second portion S(16-31) remaining in the load mode. Also, the multiplexer 12 is switched so that further control bits L are provided by bit S(14) of the S register.

A series of sixteen clock pulses CLK is now produced, one for each multiplier bit. At each clock pulse, the following actions take place:

(a) S(0-15) is shifted one place to the right. The bit shifted out at the right-hand end is discarded (since it has already been used to form the control bit L and hence is no longer needed), and bit 31 from the ALU is shifted in at the left-hand end.

(b) S(16-31) is strobed, so as to load it with C16 and bits 16-30 from the ALU.

(c) The FN register is set by the current value of the control bit L as described above.

It should be noted that all three of these actions (a)-(c) are performed simultaneously. Hence, the value of the control bit L used in action (c) is the existing value, prior to the shifting of the S register. Also, the output of the ALU used in actions (a) and (b) is that specified by the existing contents of the FN register, before it is changed by the control bit L.

In summary, it can be seen that each bit of the multiplier, starting from the least significant, is used in turn to provide the control signal L. This signal sets up the appropriate function for the ALU to form the new partial result, which is then loaded back into the S register with a shift of one place to the right. It can be seen that the signal L is always available in the cycle preceding that in which the corresponding ALU function is to occur, which allows the required ALU function to be set up immediately, avoiding any delays.

At each stage of the multiplication, the most significant bits of the partial result are always in S(16-31) while the least significant bits are shifted one at a time into S(0-15). When all the multiplier bits have been used, the multiplication is complete. The S register now holds the final result, the most significant half being held in S(16-31) and the least significant half in S(0-15).

It can be see that the processing unit described herein requires just one cycle of clock CLK for each bit of the multiplier, and hence the complete 16-bit multiplication takes just 16 cycles. This is because the S register is split into two portions which can be controlled independently, allowing the first portion S(0-15) to be shifted while the second portion S(16-31) is being loaded. Also, since the control bit L is available in advance, there is no need to have a separate cycle for testing the multiplier bit.

Moreover, each cycle is very fast. This is because each cycle involves only a 16-bit addition, rather than a 32-bit addition. Also, the output of the ALU is fed back to the S register by way of a direct path. As a result, the clock signal CLK can be faster than the normal clock beat of the processing unit: it may for example be twice the frequency of the normal clock.

What is claimed is:

1. Data processing apparatus comprising
   (a) an arithmetic and logic unit (ALU) having first and second inputs,
   (b) an operand register comprising first and second portions both connected to the first input of the ALU, the first portion being operable as a shift register independently of the operation of the second portion,
   (c) means for applying a multiplicand to the second input of the ALU,
   (d) means for loading a multiplier into the first portion of the operand register,
   (e) means for reading successive bits of the multiplier from said first portion,
   (f) control means responsive to each multiplier bit read from said first portion, for operating the ALU to produce a partial result equal to the sum of its first and second inputs in the event that the multiplier bit is equal to one, and otherwise equal to the first input, and
   (g) means for shifting the contents of the first portion one place to the right and inserting the least significant bit of said partial result into the most significant bit position of said first portion, while at the same time loading the remaining bits of said partial result in parallel into said second portion.

2. Apparatus according to claim 1 wherein said control means comprises a function register for holding each successive bit of the multiplier, and connected to the ALU to control the opeation thereof.

3. Apparatus according to claim 1 wherein the first portion of the operand register comprises the more significant half of that register and the second portion comprises the less significant half.

4. Data processing apparatus comprising
   (a) an arithmetic and logic unit (ALU) having first and second data inputs and control input,
   (b) an operand register comprising first and second portions both connected to the first data input of the ALU, the first portion being operable as a shift register independently of the operation of the second portion,
   (c) means for applying a multiplicand to the second data input of the ALU,
   (d) means for loading a multiplier into the first portion of the operand register,
   (e) means for reading a bit from the second-to-last bit position of said first portion,
   (f) function register means connected to receive said bit read from the first portion, and connected to the control input of the ALU, for operating the ALU to produce a partial result equal to the sum of its first and second data inputs in the event that said bit is equal to one, and otherwise equal to the first data input, and
   (g) means for shifting the content of the first portion one place to the right and inserting the least significant bit of said partial result into the most significant bit position of said first portion, while at the same time loading the remaining bits of said partial result in parallel into said second portion.

5. Apparatus according to claim 4 including an input register for holding an input operand, and means operable to transfer the contents of first and second halves of the input register to the first and second portions of the operand register, and alternatively operable to transfer a multiplier from the second half of the input register to the first portion of the operand register.

6. Apparatus according to claim 5 further including means for transferring the least significant bit of the input register to the function register means simultaneously with the transfer of the contents of the input register to the operand register.

* * * * *